June 26, 1945.   C. H. MILLER   2,379,173
AIRCRAFT LANDING GEAR
Filed July 1, 1940   3 Sheets-Sheet 1
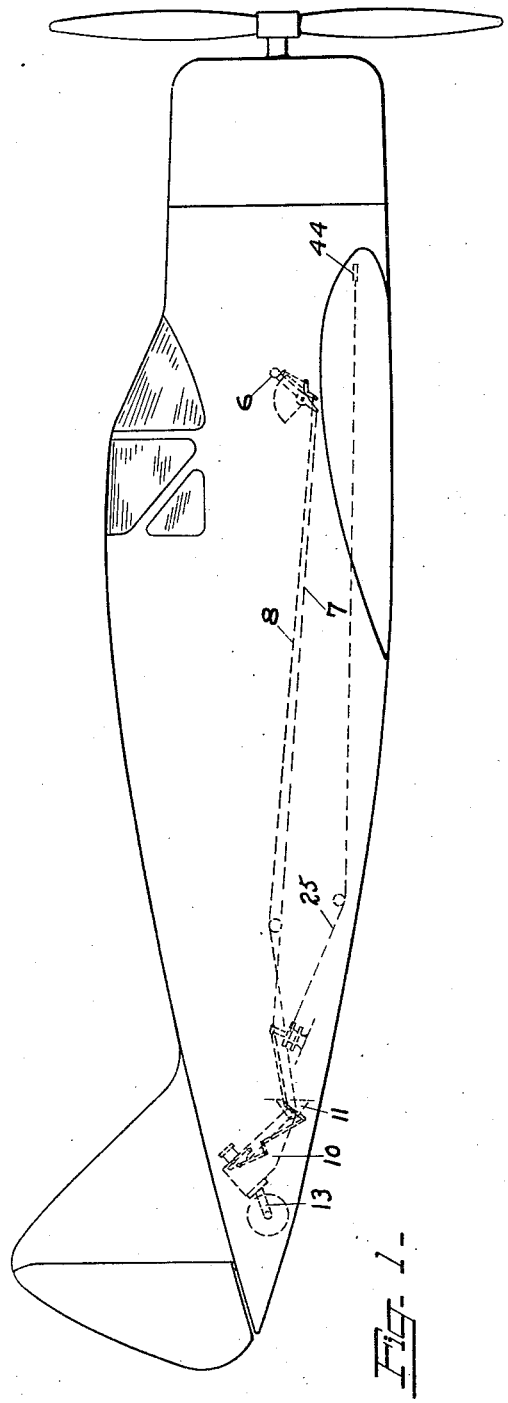
INVENTOR:
CHARLES H. MILLER
BY
Robert Rasche
ATTORNEY,

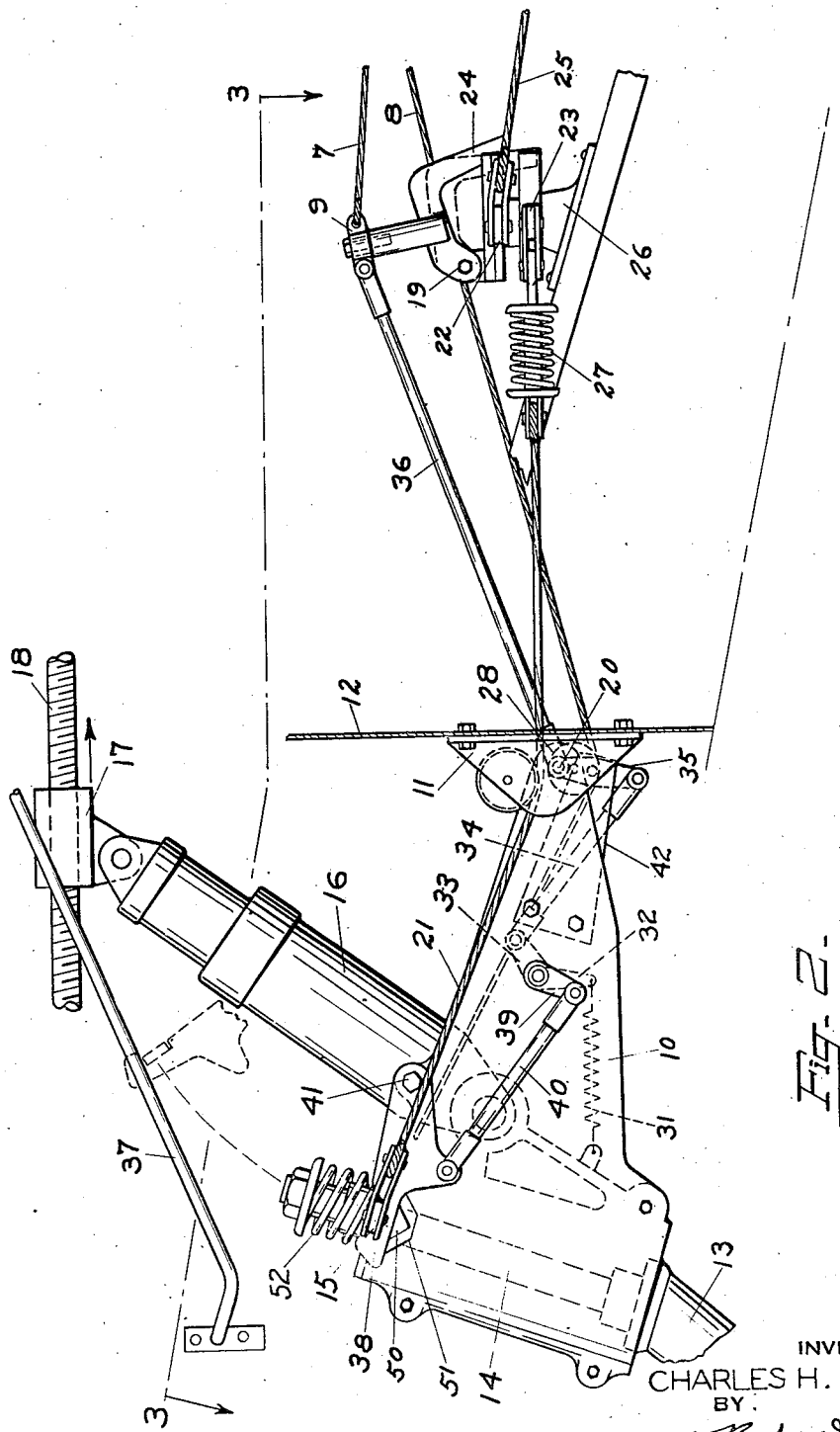

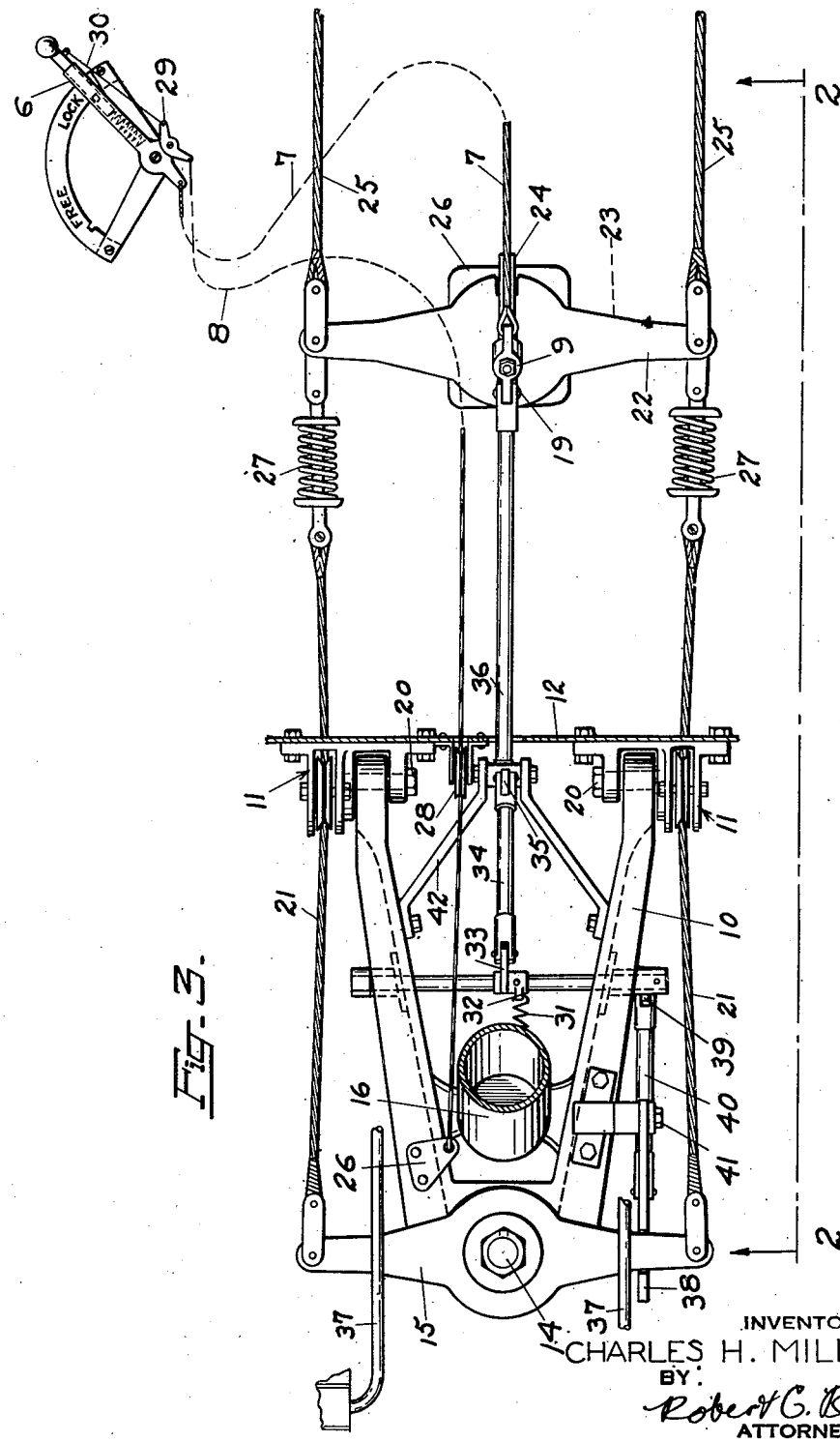

Patented June 26, 1945

2,379,173

UNITED STATES PATENT OFFICE 2,379,173

AIRCRAFT LANDING GEAR

Charles H. Miller, Amityville, N. Y., assignor to Republic Aviation Corporation, a corporation of Delaware Application July 1, 1940, Serial No. 343,340

26 Claims. (Cl. 244—50)

This invention relates to aircraft landing gear and more particularly to tail wheels of airplanes.

Heretofore, the tail wheels of airplanes have been either of the steerable fixed or swiveling type. For landing or taking off, it is desirable that the wheel be fixed, because the fixed type wheel being held in fore and aft alignment, will not throw the craft off its course and into a groundloop, in the event that the rudder has to be used to compensate for cross-winds.

A swiveling, and also an ordinary steerable tail wheel, on the other hand, will not tend to keep the craft on its course in landing or taking off but will allow the tail to swing at will, which though desirable in taxiing, is quite undesirable in taking off or landing. It is an object of this invention to provide a tail wheel that will be held in fore and aft alignment for taking off and landing and which also will be steerable for taxiing.

Another object of this invention is to provide an automatically locking tail wheel which will yet permit manual unlocking or locking of the wheel. The usual means for allowing the wheel to freely swivel when, in a sudden turn, the side thrusts or loads would otherwise break a locked wheel, are also provided.

The other objects and advantages of the invention will be made manifest as this disclosure progresses.

The presently-preferred embodiment of the invention is shown, by way of example only, in the accompanying drawings and will be further described hereinafter, but it is to be understood that the invention is limited in its embodiments only by the scope of the subjoined claims.

In these drawings:

Figure 1 is a side view of an airplane incorporating the invention;

Figure 2 is an enlarged detail side view of the invention taken on line 2—2 of Figure 3, and Figure 3 is an enlarged detail plan view along line 3—3 of Figure 2.

Referring more in detail to these drawings, there is shown a control lever 6 located conveniently to the hand of the pilot, a control cable 7 and an automatically operated locking cable 8 connecting the lever 6 to the tail wheel retracting mechanism. This mechanism comprises a tail wheel yoke 10 pivotally mounted on brackets 11 which are supported on a bulkhead 12. At one end, the yoke 10 carries a tail wheel fork 13; a spindle 14 of the tail wheel fork extends up through the yoke and carries a steering arm 15 to which it is splined. Spindle 14 carries a cam 50 riding on a camway 51, which yieldably limits rotation of the spindle to an extent ample for steering and until excessive side thrusts are brought to bear on the tail wheel, whereupon the cam rides up out of the depression in its camway against the force of a spring 52 and leaves the spindle and wheel free to swivel.

A shock strut 16 acts as a connecting rod between the yoke 10 and a nut 17 on a retracting screw 18. When the tail wheel is to be retracted, the screw 18 is rotated by a motor, not shown, in order to move the nut in the direction of the arrow, causing the shock strut to act as a connecting member, or rod, and to rotate the yoke about bolts 20 serving as pivots.

Two superposed double arms 22 and 23 are pivotally mounted on a post 26. Upper arm 22 is connected to the usual rudder-pedal bar 44 by cables 25, as shown in Figure 1. A coupling pawl 24, pivoted at 19 on the hub of the upper arm 22 may be brought into engagement with radial notches in arms 22 and 23. To lower arm 23 is attached cables 21 leading to the steering arm 15. Springs 27 are inserted between these cables 21 and lower arm 23 to absorb shocks due to swerving of the tail wheel on the ground.

The locking catch 38, pivoted at 41, and a pawl, 24, are interconnected by a linkage 40, 39, 33, 34, 35, 36 and a swivel lug 9. Tension spring 31 tends always to keep the locking catch 38 in engagement with the steering arm 15 and tends to keep the coupling pawl 24 out of engagement with the radial notch in the lower arm 23. To disengage the catch 38 and to engage the pawl 24, a pulling force sufficient to overcome the tension of spring 31, is applied to cable 7 by handling the lever 6 from "lock" to "free" position.

When the tail wheel is being retracted, steering arm 15 may be canted and in this case the higher side of the arm will come in contact with one of two guide rails 37, causing the wheel to assume automatically a proper fore and aft position or alignment.

Further raising the wheel to its fully retracted position will cause the cable 8 attached to the yoke 10 by bracket 26, to be pulled tight, because sheave 28, under which the cable runs, has its center eccentric to the pivot axis of the yoke. Cable 8 will wrap around the sheave enough to release the control lever 6 by means of a bell crank 29 and a short cable 30 pulling a catch out of the control quadrant.

Cable 7 attached to one end of lever 6 is always under tension of spring 31 acting through the cable itself and the linkage 32, 33, 34, 35 and 36. Thus, when the lever 6 is released by the cable 8, cable 7 will pull lever 6 to the "lock" position, and catch 38 will be urged into engagement with arm 15 by the spring 31 acting through linkage 32, 39, 40.

Thus when the tail wheel is retracted it is always locked fore-and-aft because cable 8, being tensioned by the retraction of the tail wheel, does not allow the control lever 6 to be set in the free position.

Then when the tail wheel is extended for a landing it is already locked in fore-and-aft alignment without any thought or action on the part of the pilot.

After the airplane has been landed the tail wheel may be made steerable with the rudder by throwing lever 6 to the "free" position. Accordingly, cable 7 attached to the lever 6 will be tensioned to overcome the force of spring 31 and cable 7, acting through the linkage, 32, 39 and 40, will disengage the catch 38 from the arm 15. At the same time the pawl 24 connects the two arms 22 and 23 together. Cable 25, leading from the rudder bar then, is in effect, connected to the cable 21 which acts to steer the tail wheel when the rudder bar is actuated.

The lever 35 of the linkage is supported on brackets 42, and has a pin, where it connects to the rod 36, on the same axis 20 as the yoke pivot, so that the retraction or extension of the wheel cannot affect its setting.

Upon coming into a landing, the tail wheel, upon being extended, will still be in the locked position, and aligned fore-and-aft; thus, any movement of the rudder to compensate for a cross-wind, etc., will not cause the wheel to turn. Once the craft has landed and the pilot wishes to taxi, the control lever 6 may be moved to the "free" position and the tail wheel will be connected by the cables 21, 25 to the rudder bar 44 and will steer with the rudder. It is possible, by removing the cable 8 from the combination, to render the operation wholly manual, in this case using the control lever 6 manually in both directions.

Various ramifications and refinements of the structure described by way of example, are contemplated by this invention, and all are to be understood as lying within the scope of the subjoined claims.

Having now made certain the nature and purposes of my invention, and at least one mode of executing same, in such manner as to enable anyone skilled in the art to which it appertains, to make and use same, as required by the statutes, that which I claim as my property, and desire to secure by Letters Patent of the United States, is:

1. In an airplane landing gear, the combination with a retractable, swiveling tail wheel mechanism; of positive locking means for locking automatically the tail wheel in fore-and-aft alignment upon retraction of the tail wheel.

2. In an airplane landing gear, the combination with a retractable, swiveling tail wheel mechanism and manually operable means for locking the tail wheel in fore-and-aft alignment, of means, operable by retraction of the tail wheel, for bringing automatically said locking means in their active position to lock the tail wheel.

3. In an airplane landing gear, the combination with a rudder mechanism comprising a rudder bar, a retractable tail wheel mechanism and steering mechanism therefor controlled by said rudder bar, of means, operable by retraction of the tail wheel, for disconnecting automatically the steering mechanism from the rudder bar, said means comprising mechanism adapted to be operated by the gear structure incidental to movement of said tail wheel mechanism into the retracted position.

4. In an airplane landing-gear, the combination with a group including a rudder-bar, a tail-wheel retracting mechanism, means for locking said wheel in fore-and-aft alignment and a tail-wheel steering mechanism controllable by means of said bar; of means operable by retraction of the tail wheel for thereby aligning said wheel fore-and-aft and means for simultaneously bringing the locking-means into locking position and disconnecting the steering mechanism from the rudder bar.

5. In an airplane landing-gear, the combination with a rudder bar and a tail-wheel steering mechanism controlled by said bar; of a coupling device supported for pivotal movement and interposed between said bar and said steering mechanism for rendering said bar effective or ineffective with respect to said steering mechanism operative or inoperative; and manually settable control means for imparting pivotal movement to said coupling device into, or out of, action.

6. In an airplane landing-gear, the combination with a rudder bar, a tail-wheel retracting mechanism and a tail-wheel steering mechanism controlled by said bar; of a coupling device interposed between the bar and the steering mechanism and having means for rendering the steering mechanism operable or inoperable by said rudder bar; means for automatically locking the tail-wheel in fore-and-aft alignment upon retraction of the tail-wheel, manually settable control means for controlling said coupling and concomitantly operating said locking means; and means actuated by the retraction of said wheel for automatically setting said control means in such manner as to disconnect said coupling device and bring the locking means into position to be active when the wheel is retracted.

7. In an airplane landing-gear, the combination with a rudder-bar, a tail-wheel retracting mechanism and a tail-wheel steering mechanism controlled by means of said bar; of a coupling device interposed between said bar and said steering mechanism and having means for rendering said steering mechanism operable or inoperable by said bar; fixed means cooperating with said steering mechanism for aligning said wheel fore-and-aft upon retraction thereof; means for automatically locking the retracted wheel in fore-and-aft alignment; manually-settable control means for controlling said coupling device and concomitantly operating said locking means; and means, actuated by the retraction of the tail-wheel, for simultaneously aligning the wheel fore-and-aft and setting said control means in a position to disconnect the coupling-device and to bring the locking means into their active position when the landing-gear is retracted.

8. In an airplane landing-gear, the combination with a rudder bar, a tail-wheel retracting mechanism and a tail-wheel steering mechanism controlled by said bar; of a coupling device interposed between said bar and said steering mechanism for rendering said mechanism operative or inoperative by said bar; means for locking the wheel in fore-and-aft alignment upon retracting of the wheel; control means manually settable selectively to two positions for, in one, connecting said coupling device and concomitantly releasing said locking means, and, in the other, throwing the coupling device out of action and concomitantly throwing the locking means into action; means constantly urging the control means into said last-mentioned position; detent-means for releasably retaining the control means in said first-mentioned position; and means, actuated by retraction of the tail-wheel, for automatically releasing said detent means.

9. In an airplane landing-gear, the combination with a rudder bar, a tail-wheel retracting mechanism, and a tail-wheel steering mechanism controllable by said bar; of a coupling device interposed between said bar and said steering mechanism and having means for rendering said steering mechanism operative or inoperative by said bar; fixed means cooperating with said steering mechanism for aligning the tail-wheel fore-and-aft upon retraction thereof; means for automatically locking the retracted wheel in fore-and-aft alignment; control means manually settable selectively into two positions for, in one position, connecting said coupling device and concomitantly releasing said locking means, and, in the other, throwing the coupling device out of action and concomitantly throwing the locking means into action; means constantly urging said control means into the last-mentioned position; detent means for releasably retaining said control means in the first-mentioned position; and means, actuatable by retraction of the tail wheel, for automatically releasing said detent means.

10. In an aircraft landing-gear, an auxiliary ground-engaging wheel; means providing for castering or swivelling thereof; a mechanism for retracting said wheel, and means for automatically locking such swivelling or castering wheel in fore-and-aft alignment upon retraction of said wheel.

11. In an aircraft retractable landing gear, having a swivelling tail wheel mounted in a pivotable yoke, manually operated means to lock this wheel in fore-and-aft alignment a handle in the cockpit having a "free" and a "lock" operating positions to control these locking means and detent means to lock said handle in its "free" position: a flexible mechanical auxiliary connection between the handle and the yoke, which is tight in the extended position of the tail wheel and is pulled by the pivoting movement of the yoke, so as to pull said detent means and thereby unlock automatically the handle and means to bring automatically the handle thus unlocked in its "lock" position, upon retraction of the landing gear.

12. In an aircraft retractable landing gear, having a swivelling tail wheel mounted in a pivotable yoke, manually operated means to lock this wheel in fore-and-aft alignment a handle in the cockpit having a "free" and a "lock" operating positions to control these locking means and detent means to lock said handle in its "free" position: a flexible mechanical auxiliary connection between the handle and the yoke, which is tight in the extended position of the tail wheel and is pulled by the pivoting movement of the yoke, so as to pull said detent means and thereby unlock automatically the handle and means to bring automatically the handle thus unlocked in its "lock" position, upon retraction of the landing gear and to prevent the return of the handle in its "free" position as long as the tail wheel stays retracted.

13. In an aircraft landing gear having a swivelling tail wheel provided with a steering arm operatively connected to the rudder bar, manually operated means to lock this wheel in fore-and-aft alignment and a handle in the cockpit to control these locking means: an interrupted flexible mechanical connection between the steering arm and the rudder bar and a coupling device, controlled by the handle to bridge the interruption in said flexible connection when the locking means are manually released.

14. In an aircraft retractable landing gear, having a swivelling tail wheel mounted in a pivotable yoke, a catch mounted on said yoke to lock this wheel in fore-and-aft alignment, a handle in the cockpit to control the catch and a flexible connection between said handle and said catch: an articulated system of links interposed between the catch and the flexible connection and having a pivot substantially concentric to the pivot of the yoke in order to maintain the same operative relation between the catch and the handle in all angular positions of the yoke.

15. In an aircraft retractable landing gear having a tail wheel rotatably mounted in a pivotable yoke and provided with a steering arm operatively connected to the rudder bar, a catch pivoted on said yoke to lock this wheel in fore-and-aft alignment and a handle in the cockpit to control this catch: a coupling device interposed between the steering arm and the rudder bar, a flexible mechanical connection between the handle and said coupling device and an articulated system of links between the catch and said coupling device, said system of links having a pivot substantially concentric to the pivot of the yoke in order to maintain the same operative relation between the catch, the coupling device and the handle in all angular positions of the yoke.

16. In an aircraft landing gear having a swivelling tail wheel provided with a steering arm operatively connected to the rudder bar, a catch to lock this wheel in fore-and-aft alignment and a handle in the cockpit to control this catch: a coupling device interposed between the steering arm and the rudder bar, a flexible mechanical connection between the handle and said coupling device and a tension spring tending constantly, on the one side, to push the catch in its active or locking position and, on the other side, to urge the coupling device in its inactive position, to tighten the flexible mechanical connection and to pull the handle into its "lock" position.

17. In an aircraft retractable landing gear, having a swivelling tail wheel mounted in a swingable yoke and provided with a steering arm operatively connected through cables to the rudder bar, a catch pivoted to the yoke to lock this wheel in fore-and-aft alignment and a handle in the cockpit to control this catch: an auxiliary cable connection between the handle and the yoke for throwing automatically the handle into its "lock" position upon retraction of the landing gear, a pair of superposed intermediary steering bars interposed in the cable connection between the steering arm and the rudder bar, a coupling pawl pivoted on the hub on one of these intermediary bars and cooperating with a radial notch provided in the other one, a linkage and a cable establishing a flexible mechanical connection between the handle and the catch, a swivel lug interconnecting this pawl and this mechanical connection and a tension spring anchored to the yoke and acting constantly upon this linkage so as to push the catch into its active or locking position, to lift the pawl out of the notch, to tighten the cable and to pull the handle into its "lock" position.

18. In an aircraft retractable landing gear, having a swivelling and steerable tail wheel mounted in a swingable yoke and provided with a pair of diametrically opposed steering arms: a pair of fixed and rigid, baffles symmetrically secured to the fuselage of the aircraft on each side of said yoke and cooperating with said steering arms so as to center automatically the tail-wheel in fore-and-aft alignment upon its retraction.

19. In an airplane landing gear, the combination with a retractable, swivelled tail wheel mechanism; of positive means for automatically locking the tail wheel in fore-and-aft alignment by the retraction of the tail wheel and independently of any pilot-manipulation of said gear.

20. In an airplane landing gear, a tail element for engagement with the terrain, means supporting said element for swivel movement, means for supporting said first-named means for movement to effect selective placement of said element either in the normal operative position thereof or in a retracted position of the same; and means operable, incidental to displacement of said element from the normal operative position thereof into the retracted position of the same, to effect rotation of said element into substantially fore-and-aft alignment with respect to the airplane fuselage.

21. In an airplane landing gear: a tail element for engagement with the terrain, means supporting said element for swivel movement, means for supporting said first-named means for movement to effect selective placement of said element either in the normal operative position thereof or in a retracted position of the same; means operable, incidental to displacement of said element from the normal operative position thereof into the retracted position of the same, to effect rotation of said element into substantially fore-and-aft alignment with respect to the airplane fuselage, and means for locking said tail element against swivelling when in its retracted position.

22. The combination with airplane landing gear having a swivelled, retractable tail element for engagement with the terrain and having means effective by pilot-manipulation to retract said element; of means operable automatically and incidental to the functioning of said retracting means to lock said element in substantially a fore-and-aft position with respect to the airplane fuselage.

23. In an airplane landing gear: a tail element for engagement with the terrain, means supporting said element for bodily movement into a position of retraction with respect to the airplane fuselage and for swivel movement when said element is in the normal operative position thereof, means for locking said element in substantially fore-and-aft alignment with respect to said fuselage, and means operable by pilot-manipulation to effect retraction of said element and substantially simultaneous locking action of said locking means and to effect movement of said element into the normal operative position thereof; said locking means being adapted, during movement of said element from the retracted position to the normal operative position thereof, to maintain its locking relation with respect to said element.

24. In an aircraft, the combination with the main landing gear thereof, of a yoke pivotally mounted for retracting and protracting movements in a plane passing through the longitudinal axis of the aircraft, an auxiliary ground engaging means swivelled to said yoke, and means, responsive to the movement of said yoke, for automatically and positively locking said engaging means against swivelling movement.

25. In an aircraft landing gear, the combination with a yoke pivotally mounted for retracting and protracting movements in a plane passing through the longitudinal axis of the aircraft, of an auxiliary wheel swivelled to said yoke, and means for automatically and positively interlocking said wheel and said yoke upon movement of said latter.

26. In an aircraft landing gear, the combination with an auxiliary castering wheel, of a mechanism to retract and protract said wheel, and means for automatically preventing castering of said wheel upon actuation of said mechanism.

CHARLES H. MILLER.